June 5, 1956  K. A. STRITTER  2,748,406
METHODS OF MAKING PREWELT SHOES
Filed Jan. 22, 1953  2 Sheets-Sheet 1

Inventor
Karl A. Stritter
By his Attorney

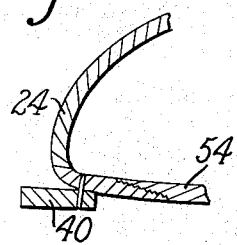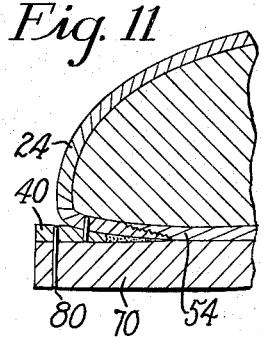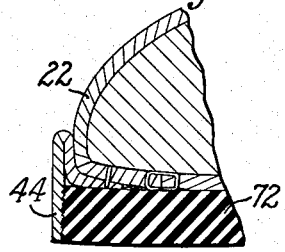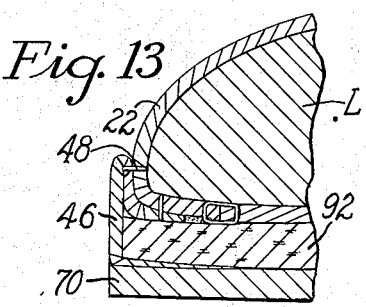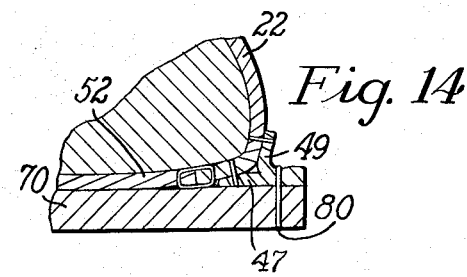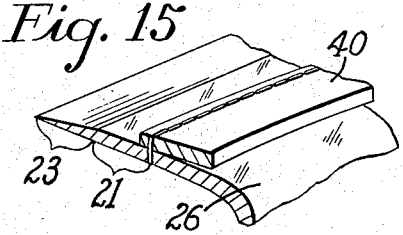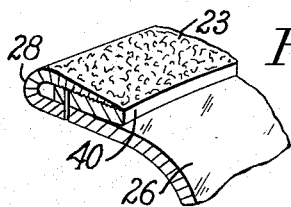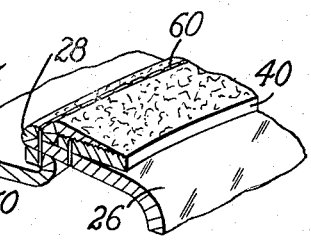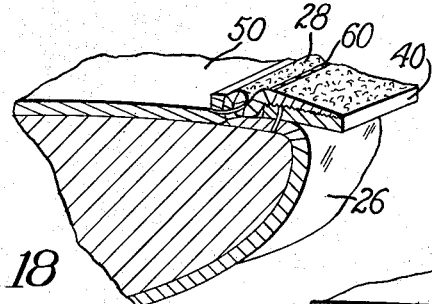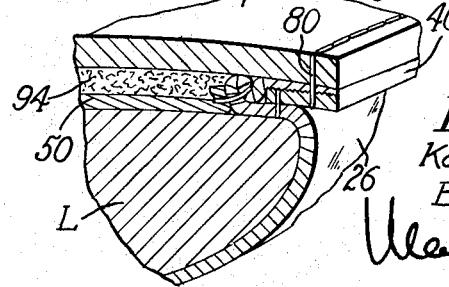

United States Patent Office 2,748,406
Patented June 5, 1956

2,748,406

METHODS OF MAKING PREWELT SHOES

Karl A. Stritter, Nahant, Mass., assignor to United Shoe Machinery Corporation, Flemington, N. J., a corporation of New Jersey Application January 22, 1953, Serial No. 332,629

2 Claims. (Cl. 12—142)

This invention relates to methods of making shoes. The invention relates particularly to shoes of the prewelt type, that is, shoes in which a welt or other sole-attaching strip is first secured to the upper. Preferably also the shoes are made by a method known as "slip-lasting."

In a simple form well adapted to making shoes of the casual type, the procedure is to select a last, and to cut an upper to fit the last and provide thereon a marginal extension of uniform width to extend under the last bottom when the selected last is inserted therein. The marginal extension is usually referred to as a "lasting allowance," which term as used herein refers to such extension. A welt is then sewed to the lasting allowance of the upper along a line which will lie in the completed shoe slightly under the last bottom with a substantial portion of the lasting allowance projecting beyond the welt. A sock lining smaller than the last bottom is secured to the lasting allowance of the upper. The selected last is then forced into the shoe and an outsole attached to the welt.

The sock lining and lasting allowance may be sewed together by an over-edge seam so that when put on a last the lasting allowance and the sock lining will lie in the same plane.

The welt or sole-attaching strip may be extended to form a cover for a platform sole and, after the cover is lasted about the platform, an outsole may be attached.

The lasting allowance and the margin of the sock lining may be skived and the skived portions lapped upon each other and secured by cement either before or after last insertion, thus securing a smooth and attractive appearance inside the shoe.

The welt strip may be wide enough to be carried up the side of the shoe, then turned down upon itself and secured to the edge face of the sole, this construction being especially appropriate when the strip and sole are of crepe rubber.

A similar effect may be obtained when a welt strip of leather is used by carrying the strip up the side of the shoe and sewing it to the upper, then turning it downwardly upon itself and securing it to the bottom of a midsole.

To obtain a storm welt effect, the welt in its inner portion at least may be in two layers, the upper layer being turned up against the upper and sewed thereto, the lower layer being attached to the upper by another seam.

In another modification the upper may be extended to form an extra wide lasting allowance and, after the welt is attached to the upper, the extra width or extension of the lasting allowance is folded against the welt and cemented thereto. Then the sock lining is sewed to the fold of the lasting allowance, a last inserted and an outsole sewed to the welt, the stitches also passing through the extra width of the lasting allowance.

In the drawings—

Fig. 10 is a fragmentary sectional view of a modification showing the upper and sock lining skived and secured together by cement;

Fig. 11 is a fragmentary sectional view showing a shoe prepared as in Fig. 10 on a last with the outsole attached;

Fig. 12 is a fragmentary sectional view of a modification similar to Fig. 8 in which the welt or sole-attaching strip is extended up the side of the shoe, then folded down and secured to the edge face of a sole;

Fig. 13 is a view of a modification similar to Fig. 12 in which the welt or sole-attaching strip is extended to form a cover for a midsole, an outsole being cement-attached to the cover;

Fig. 14 is a fragmentary sectional view of a modification of a shoe similar to Fig. 8 in which the inner portion of the welt is split to form two layers, the upper layer being secured to the side of the upper and the lower layer to the lasting allowance and the portion of full thickness to the sole;

Fig. 15 is a perspective view of a modification, partly in section, showing a welted upper with an extended lasting allowance;

Fig. 16 is a view similar to Fig. 15 showing the extension of the lasting allowance turned upon itself and secured to the welt;

Fig. 17 is a view similar to Fig. 16 showing the fold of the lasting allowance sewed to a sock lining;

Fig. 18 is a fragmentary sectional view in perspective of a shoe prepared as in Fig. 17 after being slip-lasted; and Fig. 19 is a view similar to Fig. 18 showing the sole attached.

Figure 1:
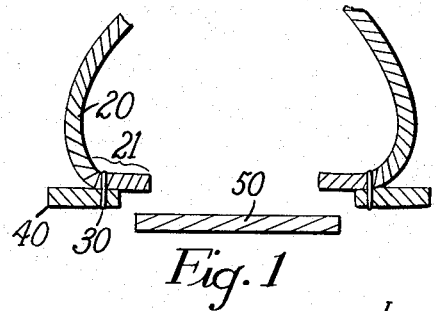
Fig. 1 is a sectional view showing an upper having a lasting allowance with a welt attached thereto and a sock lining to which the upper is to be secured.
Figure 2:
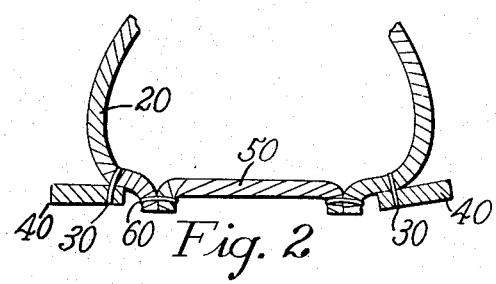
Fig. 2 is a sectional view showing the upper attached to a sock lining by an outside seam.
Figure 3:
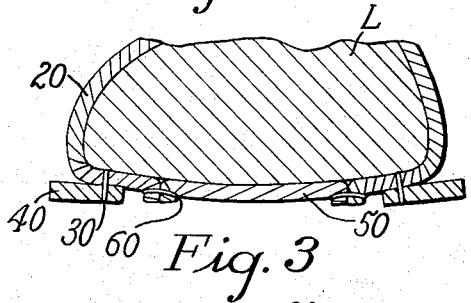
Fig. 3 is a view similar to Fig. 2 showing a last inserted in the shoe.
Figure 4:
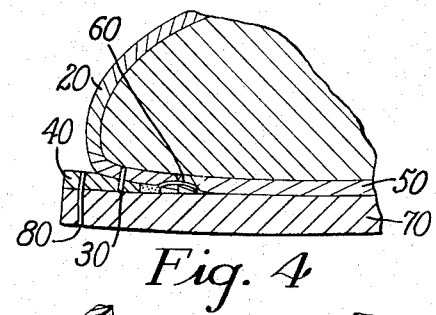
Fig. 4 is a view similar to Fig. 3 showing an outsole sewed to the welt.

In carrying out the method of the present invention as herein illustrated, a last is selected and a prewelt upper 20 is cut to fit the last and to have a lasting allowance 21 of say one-half inch plus a seam allowance of say one-eighth inch. To this lasting allowance is attached by a seam 30 a welt or sole-attaching strip 40, the line of attachment 30 being through the inner portion of the strip and through the outer portion of the lasting allowance which will lie just under the edge of the last bottom when the selected last is inserted, as shown in Fig. 3. A sock lining 50 is provided which, except for its seam allowance, is smaller than a last bottom by an amount substantially equal to the width of the lasting allowance of the upper. The lasting allowance 21 and the sock lining 50 are now sewed together by an outside seam 60 (Fig. 2). The selected last L is next inserted, as shown in Fig. 3, and an outsole 70 laid and attached to the welt 40 by an outseam 80, as indicated in Fig. 4.

Figure 5:
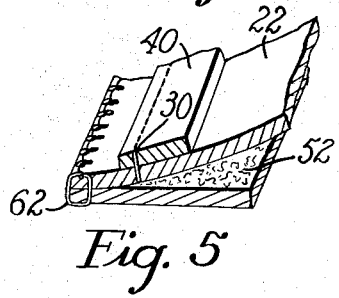
Fig. 5 is a perspective view of a modification showing how the welt and the lasting allowance of the upper may be attached by an over-edge seam.
Figure 6:
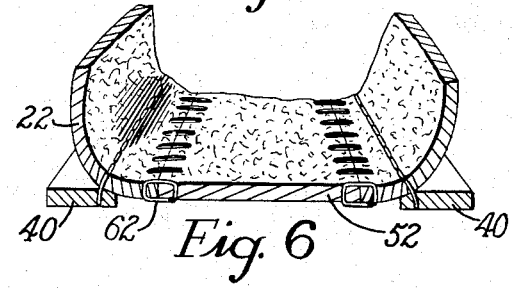
Fig. 6 is a fragmentary perspective view showing the parts connected, as shown in Fig. 5, spread out to receive the last.
Figure 7:
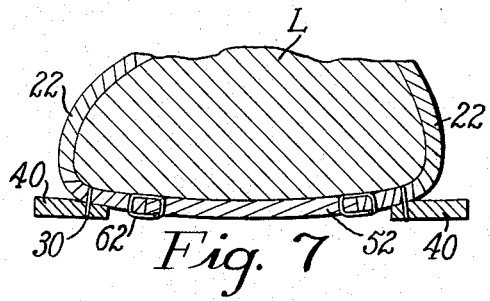
Fig. 7 is a sectional view showing a last inserted into the shoe of Fig. 6.
Figure 8:
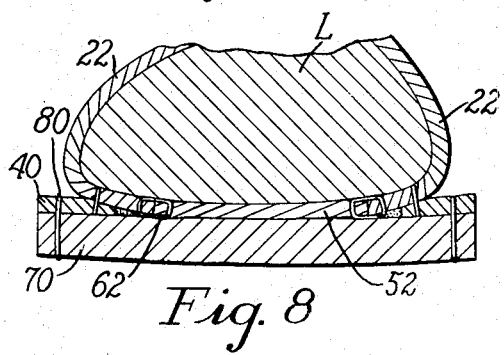
Fig. 8 is a view similar to Fig. 7 showing a sole attached.

Substantially the same shoe parts as above described are shown in Figs. 5 to 8 somewhat modified, the difference being that the lasting allowance of the upper and the sock lining are not provided with a seam allowance, thus effecting a saving of material. In this form the lasting allowance of an upper 22 and the sock lining 52 are united by an over-edge seam 62, as indicated in Fig. 5. The over-edge seam 62 includes the edges of the lasting allowance and the sock lining with loops of thread so that the edges of the lasting allowance and the sock lining may be flattened out, as indicated in Fig. 6, to make them lie in the same plane. The last L is inserted in the upper, as indicated in Fig. 7, and a sole 70 attached to the welt 40 by a seam 80, as shown in Fig. 8.

Figure 9:
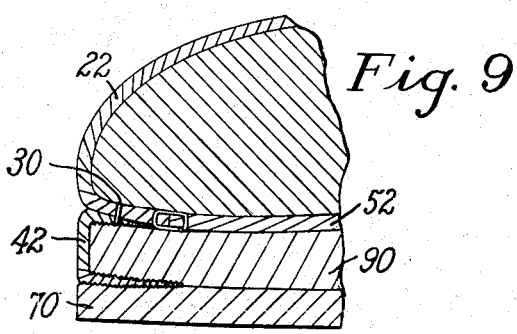
Fig. 9 is a view of a modification similar to Fig. 8 in which the welt or sole-attaching strip is extended to form a cover for a midsole or platform, an outsole being cement-attached to the cover.

In Fig. 9 a modified sole-attaching strip 42 is shown which is wide enough to form a cover for a midsole 90, the outsole 70 being cement-attached to the lasted-over portion of the cover.

In a modified form, as shown in Figs. 10 and 11, an upper 24 may have a portion of its lasting allowance skived and a marginal portion of the sock lining 54 may be correspondingly skived. The skived portion may be cement-attached either before or after the last L is inserted, a shoe bottom of uniform thickness being thus provided. The outsole 70 is attached by the seam 80 to the welt 40 as before (see Fig. 11).

As shown in Fig. 12, the shoe of Fig. 4 or Fig. 8 may be modified by providing a wide sole-attaching strip 44 which is carried up the side of the shoe, then folded upon itself and secured by cement or otherwise to the edge face of a sole 72, this construction being especially appropriate when the strip and the sole are of crepe rubber.

In Fig. 13 a modified construction similar to Fig. 12 is shown in which a sole-attaching strip 46, preferably of leather, is carried up the side of the shoe and secured at 48 to the upper a substantial distance above the sock lining, then folded upon itself and folded over the bottom of a cushion midsole 92, an outsole 70 being attached to the strip by cement.

In Fig. 14 a modified construction similar to Fig. 8 is shown in which the welt is split from the inner edge to form two layers 49 and 47, the upper layer 49 being turned upwardly and stitched to the side of the upper 22, the lower flap 47 being attached to the lasting allowance, and the portion of full thickness being sewed to the outsole 70 by a seam 80.

Figs. 15 to 19 relate to a modified construction similar to that first described except that the lasting allowance 21 of an upper 26 is extended at 23 to about twice the usual width, the extension being skived, folded back at 28 (Fig. 16) and cemented to the welt 40. The fold 28, which includes the lasting allowance 21 as well as the excess or extension 23, is then sewed, off a last, to the sock lining 50, as shown in Fig. 17. The shoe is then slip-lasted, as indicated in Fig. 18, and an outsole 70 attached by an outseam 80 which passes through the welt, the upper and the outsole, as shown in Fig. 19. In this construction a filler 94 may be provided because of the greater substance in the seam uniting the upper and sock lining.

Having thus described my invention, what I claim as new and desire to secure by Letters Patent of the United States is:

1. That improvement in methods of making prewelt shoes which consists in selecting a last, providing a prewelted upper to fit the last and to have a lasting allowance projecting beyond the welt, providing a sock lining smaller than the last bottom, disposing the projecting portion of the lasting allowance and the sock lining with their edges flush, securing their edges together by over-edge stitching off the last, inserting the selected last into the shoe to dispose the lasting allowance and the sock lining in the same plane, providing a sole, and attaching the sole to the welt.

2. That improvement in methods of making shoes which consists in selecting a last, providing an upper fitting the last and having a lasting allowance, providing a sole-attaching strip, stitching the sole-attaching strip to the lasting allowance off the last so that the major portion of the lasting allowance projects beyond the strip, providing a sock lining smaller than the last bottom by an amount substantially equal to the width of the lasting allowance, disposing the lasting allowance and the sock lining with their edges flush, uniting the flush edges by over-edge stitching, inserting the selected last into the upper to shape the shoe and cause the lasting allowance and the sock lining to lie in the same plane, providing a sole member, and attaching the sole-attaching strip to the sole member.

References Cited in the file of this patent

UNITED STATES PATENTS

| | | |
|---|---|---|
| 268,656 | Folsom | Dec. 5, 1882 |
| 1,515,198 | Gorman | Nov. 11, 1924 |
| 1,528,260 | Morin | Mar. 3, 1925 |
| 2,081,887 | Bain | May 25, 1937 |
| 2,200,579 | Marshall | May 14, 1940 |
| 2,284,810 | Engel | June 2, 1942 |
| 2,346,960 | Grossman | Apr. 18, 1944 |
| 2,390,042 | Barna | Dec. 4, 1945 |
| 2,425,445 | Stritter | Aug. 12, 1947 |
| 2,432,340 | Schlecht | Dec. 9, 1947 |
| 2,467,466 | Curtin | Apr. 19, 1949 |
| 2,471,696 | Milchen | May 31, 1949 |
| 2,473,605 | Orlando | June 21, 1949 |
| 2,550,881 | Stritter | May 1, 1951 |
| 2,571,299 | Sherbrook | Oct. 16, 1951 |
| 2,641,006 | Lipton | June 9, 1953 |
| 2,646,584 | Herlihy | July 28, 1953 |